(12) United States Patent
Kurian et al.

(10) Patent No.: US 11,357,006 B2
(45) Date of Patent: Jun. 7, 2022

(54) SELECTIVE MULTI-LINK OPERATION IN A WIRELESS LOCAL AREA NETWORK

(71) Applicant: Apple Inc., Cupertino, CA (US)

(72) Inventors: Lawrie Kurian, San Jose, CA (US); Guoqing Li, Cupertino, CA (US); Sudheer Konda, Santa Clara, CA (US); Tashbeeb Haque, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 16/890,031

(22) Filed: Jun. 2, 2020

(65) Prior Publication Data
US 2021/0212062 A1 Jul. 8, 2021

Related U.S. Application Data

(60) Provisional application No. 62/956,429, filed on Jan. 2, 2020.

(51) Int. Cl.
*H04W 72/04* (2009.01)
*H04W 84/12* (2009.01)
*H04W 4/80* (2018.01)

(52) U.S. Cl.
CPC ......... *H04W 72/0453* (2013.01); *H04W 4/80* (2018.02); *H04W 84/12* (2013.01)

(58) Field of Classification Search
CPC ......... H04W 72/0453; H04W 72/1215; H04W 4/80; H04W 84/12
See application file for complete search history.

(56) References Cited

U.S. PATENT DOCUMENTS

| 8,121,101 | B2 | 2/2012 | Kalogridis et al. | |
| 8,155,695 | B2 | 4/2012 | Wang et al. | |
| 9,706,572 | B2 | 7/2017 | Bhushan et al. | |
| 10,667,258 | B2 | 5/2020 | Garcia-Saavedra et al. | |
| 2015/0350598 | A1* | 12/2015 | Yang | H04W 72/085 348/14.02 |
| 2016/0192214 | A1* | 6/2016 | Yu | H04W 76/15 370/228 |
| 2016/0381704 | A1* | 12/2016 | Chu | H04W 52/0216 370/329 |
| 2017/0006632 | A1 | 1/2017 | Elliott et al. | |
| 2019/0181909 | A1* | 6/2019 | Lee | H04B 1/713 |
| 2019/0327679 | A1* | 10/2019 | Gupta | H04W 52/0229 |
| 2020/0053599 | A1 | 2/2020 | Damnjanovic | |

* cited by examiner

*Primary Examiner* — Farid Seyedvosoghi
(74) *Attorney, Agent, or Firm* — Kowert, Hood, Munyon, Rankin & Goetzel, P.C.

(57) ABSTRACT

This disclosure relates to methods for conducting multilink communications between a user equipment (UE) device and a remote device over a wireless local area network (WLAN). The UE device periodically transmits communications to the remote device over a first frequency band on the WLAN using a first radio. The UE device may determine to switch from transmitting communications to the remote device over the first frequency band to transmitting said communications over a second frequency band. The UE device then transmits communications to the remote device over the second frequency band on the WLAN.

20 Claims, 11 Drawing Sheets

SELECTIVE MULTI-LINK OPERATION IN A WIRELESS LOCAL AREA NETWORK

PRIORITY CLAIM

This application claims priority to U.S. Provisional Patent Application No. 62/956,429, titled "Selective Multi-link Operation in a Wireless Local Area Network" and filed on Jan. 2, 2020, which is hereby incorporated by reference in its entirety, as though fully and completely set forth herein.

TECHNICAL FIELD

The present application relates to wireless communication, including techniques and devices for improved performance of a user equipment device in a multi-link wireless local area network architecture.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices, or user equipment devices (UEs) may take the form of smart phones or tablets that a user typically carries. Additionally, UEs may be configured to simultaneously communicate over multiple wireless links over a wireless local area network (WLAN). The availability of multiple WLAN links may offer a potential for increased throughput and latency reduction. However, avoiding traffic collisions and congestion may be more difficult in a multiple link environment. Accordingly, improvements in the field are desired.

SUMMARY

Embodiments are presented herein of, inter alia, systems, apparatuses, and methods for devices for improved performance of a user equipment device in a multi-link wireless local area network (WLAN) environment.

A user equipment device (UE) may comprise one or more antennas, one or more radios operably coupled to the one or more antennas, and a processor operably coupled to the one or more radios.

In some embodiments, the UE may exchange capability information with a remote device over a primary frequency band of a wireless local area network (WLAN). The UE may exchange signaling to set up selective transmission over the WLAN. The UE may transmit a notification to the remote device to initiate selective transmission over an alternative frequency band. In some embodiments, transmitting the notification to the remote device to initiate selective transmission over the alternative frequency band may be performed in response to determining that a frame associated with the first frequency band has been reserved for longer than a threshold duration of time In some embodiments, the UE may then transmit one or more messages to the remote device over the alternative frequency band. In some embodiments, said transmitting the one or more messages over the alternative frequency band may be performed until a remaining duration of time that the frame is reserved is less than the threshold duration of time.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

and

Figure 11:
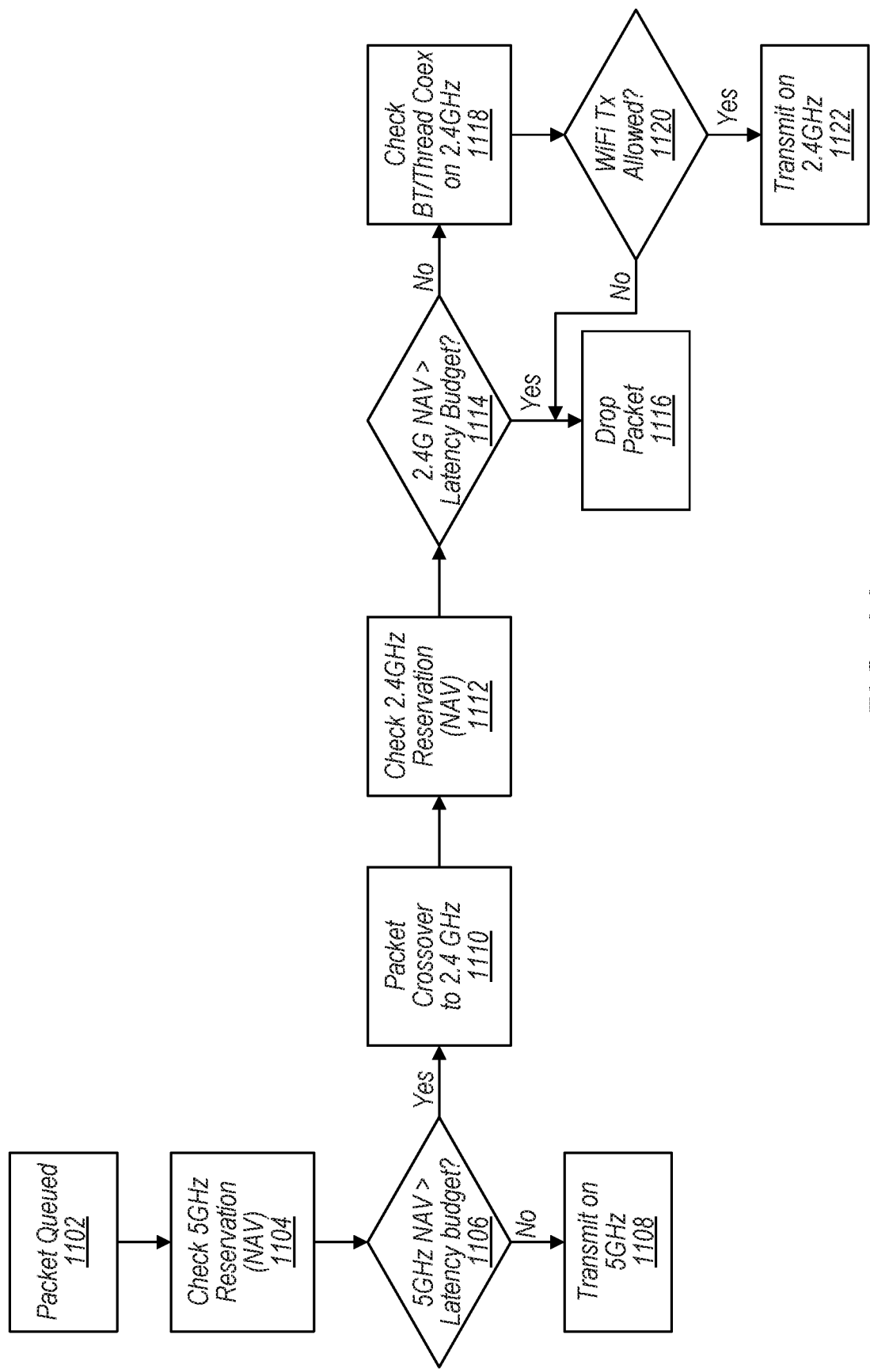

FIG. 11 is a flowchart diagram illustrating a method for mitigating late packet transmissions, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
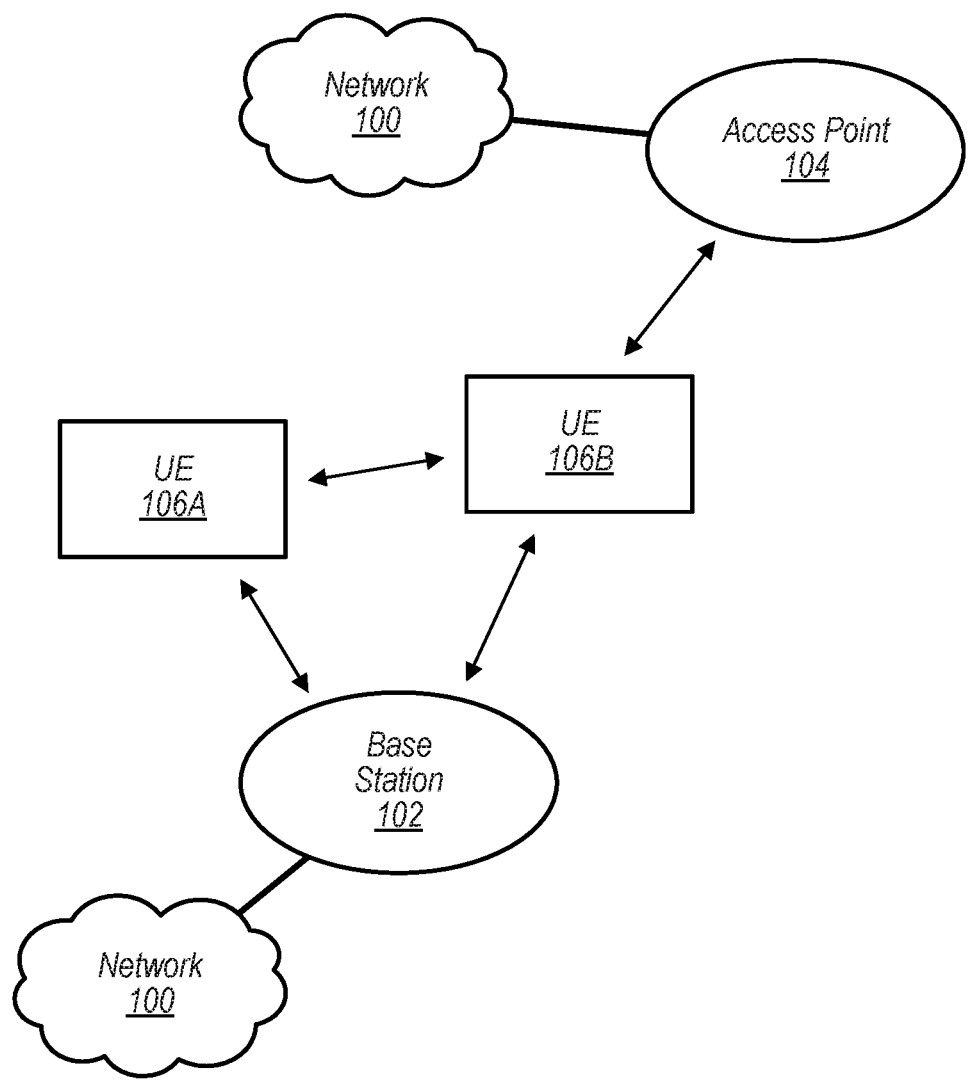
FIG. 1 illustrates an example wireless communication system including a user equipment device (UE), according to some embodiments.
Figure 2:
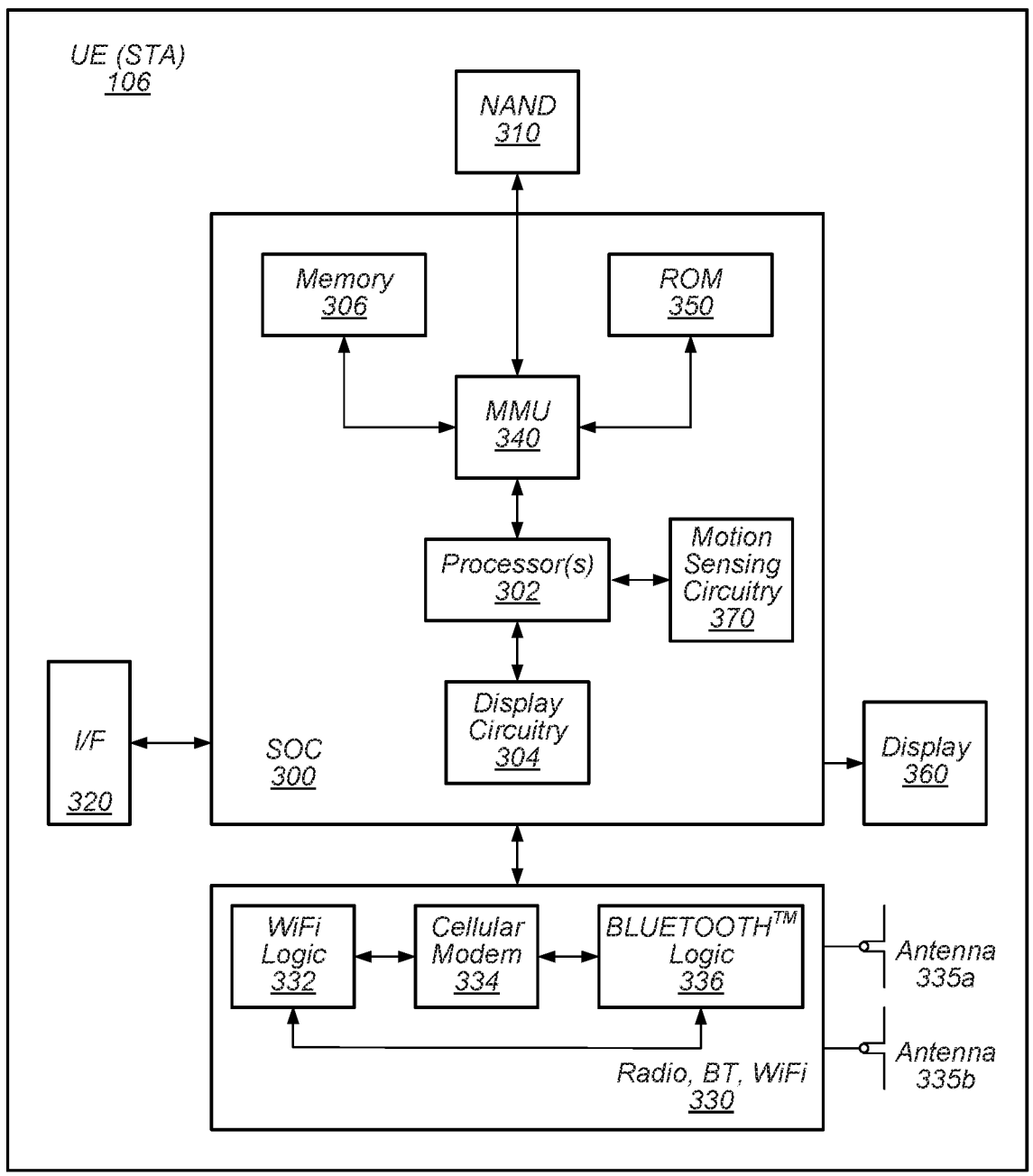
FIG. 2 is a block diagram illustrating an example UE, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc. Wireless devices 106A and 106B may be user devices, which may be referred to herein as "user equipment" (UE), UEs, or UE devices.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, ay, be and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, LTE, LTE-A, 5G NR, WLAN, WiFi, Bluetooth™, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

As shown, the exemplary wireless communication system also includes a WLAN access point (AP) 104, which communicates over a transmission medium with the wireless device 106B. The WLAN access point, which may be a Wi-Fi AP, also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The UE 106 may include a device or integrated circuit for facilitating cellular communication, referred to as a cellular modem. The cellular modem may include one or more processors (processor elements) and various hardware components as described herein. The UE 106 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios, each of which may be configured to communicate via a respective wireless link. Other configurations are also possible.

FIG. 2—Example Block Diagram of a UE Device

FIG. 2 illustrates one possible block diagram of an UE device, such as UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BlueTooth™, Wi-Fi, NFC, GPS, etc.).

The UE device 106 may include at least one antenna, and in some embodiments multiple antennas 335a and 335b, for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs).

The wireless communication circuitry 330 may include Wi-Fi Logic 332, a Cellular Modem 334, and BlueTooth™ Logic 336. The Wi-Fi Logic 332 is for enabling the UE device 106 to perform Wi-Fi or other WLAN communications on an 802.11 network. The BlueTooth™ Logic 336 is for enabling the UE device 106 to perform BlueTooth™ communications. The cellular modem 334 may be a cellular modem capable of performing cellular communication according to one or more cellular communication technologies.

As described herein, UE 106 may include hardware and software components for implementing embodiments of this disclosure. For example, one or more components of the wireless communication circuitry 330 (e.g., Wi-Fi logic 332, cellular modem 334, BT logic 336) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
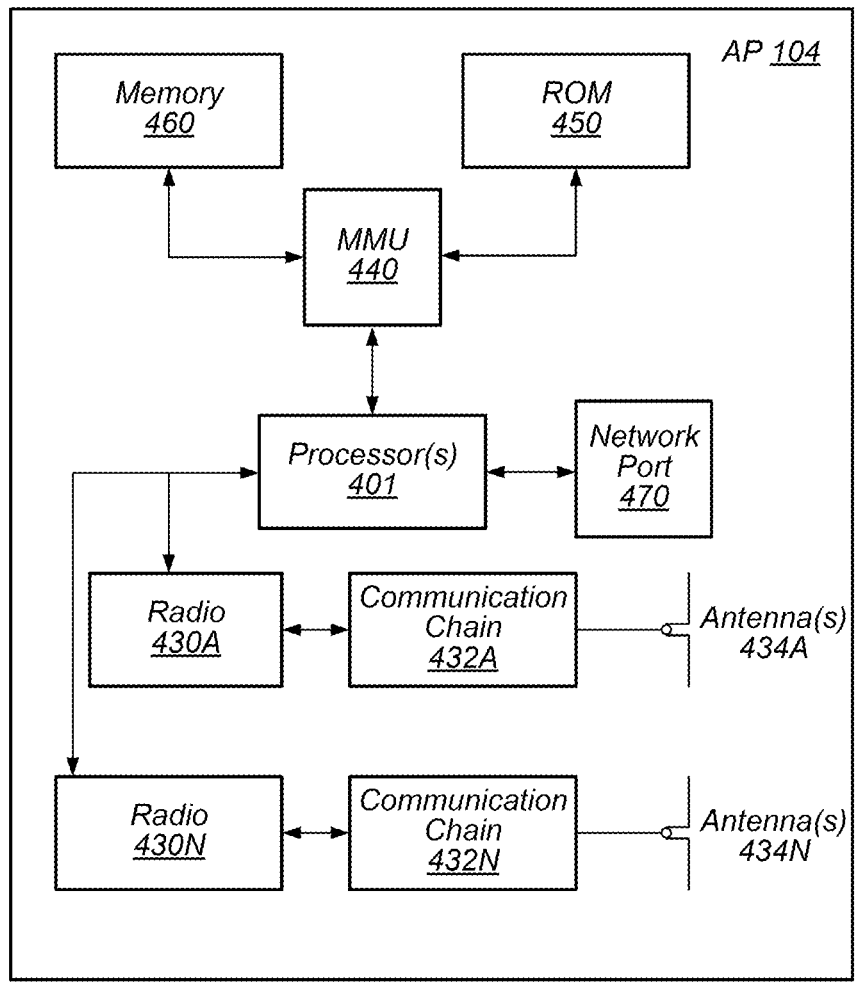
FIG. 3 is a block diagram illustrating an example wireless access point, according to some embodiments.

FIG. 3—Block Diagram of an Access Point

FIG. 3 illustrates an example block diagram of an access point (AP) 104, according to some embodiments. It is noted that the AP of FIG. 3 is merely one example of a possible access point. As shown, AP 104 may include processor(s) 401 which may execute program instructions for the AP 104. The processor(s) 401 may also be coupled to memory management unit (MMU) 440, which may be configured to receive addresses from the processor(s) 401 and translate those addresses to locations in memory (e.g., memory 460 and read only memory (ROM) 450) or to other circuits or devices.

The AP 104 may include at least one network port 470. The network port 470 may be configured to couple to a telephone network and provide a plurality of devices, such as UE devices 106, access to the telephone network as described above in FIG. 1.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The AP 104 may include one or more radios 430A-430N, each of which may be coupled to a respective communication chain and at least one antenna 434, and possibly multiple antennas. The antenna(s) 434 may be configured to operate as a wireless transceiver and may be further configured to communicate with UE devices 106/107 via radio 430. The antenna(s) 434A-N communicate with their respective radios 430A-N via communication chains 432A-N. Communication chains 432 may be receive chains, transmit chains, or both. The radios 430A-N may be configured to communicate via various wireless communication standards, including, but not limited to, LTE, LTE-A, NR, GSM, UMTS, CDMA2000, Wi-Fi, etc. The UE 104 may be configured to operate in multiple wireless links using the one or more radios 430A-N, wherein each radio is used to operate in a respective wireless link.

The AP 104 may be configured to communicate wirelessly using multiple wireless communication standards. In some instances, the base station 102 may include multiple radios, which may enable the network entity to communicate according to multiple wireless communication technologies. For example, as one possibility, the AP 104 may include an LTE or 5G NR radio for performing communication according to LTE as well as a Wi-Fi radio for performing communication according to Wi-Fi. In such a case, the AP 104 may be capable of operating as both an LTE base station and a Wi-Fi access point. As another possibility, the AP 104 may include a multi-mode radio which is capable of performing communications according to any of multiple wireless communication technologies (e.g., NR and Wi-Fi, NR and UMTS, LTE and CDMA2000, UMTS and GSM, etc.). As still another possibility, the AP 104 may be configured to act exclusively as a Wi-Fi access point, e.g., without cellular communication capability.

As described further subsequently herein, the AP 104 may include hardware and software components for implementing or supporting implementation of features described herein. The processor 401 of the access point 104 may be configured to implement or support implementation of part or all of the methods described herein, e.g., by executing program instructions stored on a memory medium (e.g., a non-transitory computer-readable memory medium) to operate multiple wireless links using multiple respective radios. Alternatively, the processor 401 may be configured as a programmable hardware element, such as an FPGA (Field Programmable Gate Array), or as an ASIC (Application Specific Integrated Circuit), or a combination thereof. Alternatively (or in addition) the processor 401 of the AP 104, in conjunction with one or more of the other components 430, 432, 434, 440, 450, 460, 470 may be configured to implement or support implementation of part or all of the features described herein.

WLAN Communication Over Multiple Wireless Links

It is anticipated that upcoming implementations of wireless local area networks (WLANs) may utilize multiple links during communications between two wireless stations (STAs), e.g., two UEs 106 illustrated in FIG. 2, or between a wireless STA and a wireless access point (AP) such as the AP 104 illustrated in FIG. 3, in either or both of uplink and downlink communications. The STA may be any of a variety of types of wireless stations, including but not limited to a UE 106, a smart phone, tablet, personal computer, smart watch, accessory device, or any other type of wireless device capable of communicating over a WLAN.

The 802.11ax standard allows STAs and APs to communicate according to either a 5 GHz link or a 2.4 GHz link, and it is anticipated that 802.11.be may allow STAs and APs to communicate over a 6 GHz link in addition to the 2.4 GHz and 5 GHz, to improve throughput and reduce communication latency. In general, a higher frequency link may be preferred as a default link for communications due to the higher throughput, and one or more lower frequency links may be utilized as backup to reduce latency and increase overall throughput. Embodiments herein propose methods and devices for selective multi-link operation in these and other communication environments.

In some current implementations of a wireless local area network (WLAN), a WLAN-capable device such as a UE device 106 may pause its backoff timer and/or new transmission attempts if it determines that the WLAN medium (e.g., a particular bandwidth used for WLAN communications, such as 5 GHz or 2.4 GHz) is currently in use by another device. The UE may resume the backoff timer and new transmission attempts only after the network allocation vector (NAV) time, which may be specified in the MAC header field or duration field, expires. The maximum duration for which a device is allowed to reserve the WLAN medium may be set to a maximum duration (such as around 32 ms, in some implementations), and the specific duration of a WLAN medium reservation may be specified by the NAV.

In some embodiments, when a device sets a NAV duration in its packet, it may block the medium for the entire NAV duration and all other devices may have to wait to initiate any new packet transmissions. Long NAV reservations near the maximum allowable duration of 32 ms have been utilized in some WiFi devices for various reasons such as channel measurement, radio frequency (RF) tuning, etc. However, long NAV durations may impair the user experience for some latency-sensitive applications such as audio stereo pairing which have a latency requirement in the range of 10 ms. In this example, an audio packet may have to wait for a long NAV to expire and in doing so it may exceed the latency requirement of the audio service, leading to audio glitches and a poor user experience. In addition to NAV reservation, in congested environments the channel may be otherwise occupied by other devices for sufficiently long durations of time to prevent a low latency device from transmitting in time to satisfy its latency requirements.

Some WLAN devices may have dual-band radios (e.g., 2.4 GHz and 5 GHz) or even tri-band (2.4/5/6 GHz). In some embodiments, this multi-radio capability may be utilized to mitigate the latency problems described above. As used herein, a "link" is defined as a communication channel on a particular frequency band for performing WLAN communications. Accordingly, "multi-link" communications refer to a transmitter and receiver using multiple bands concurrently or selectively. Furthermore, the "resident band" may refer to the primary band used for communications, while the "alternative band" may refer to the backup band used for communications.

In some embodiments, for low latency applications over a WLAN, it may be desirable for the transmitter to deliver the packets to the receiver within a strict allotted time budget, such as 20 msec or another duration. Delayed packets that are received outside of the allotted time budget may be considered stale and may be dropped, adversely impacting the quality of service intended for the specific application and potentially causing an undesirable user experience.

In some embodiments, before a UE may transmit over a WLAN medium, it may have to wait for any ongoing network allocation vector (NAV) reservation to expire, upon which the UE may contend for access to the medium. A longer duration NAV reservation by another device in the medium may potentially delay the transmission of the packet and cause late arrival at the receiver. The maximum NAV reservation currently allowed under the 802.11 specification is 32.767 milliseconds. As noted above, if a neighboring device reserves the WLAN medium for this duration, it may impact the latency budget set for a particular application (e.g., for low latency applications with a 20 msec latency requirement, as one example). In some embodiments, WLAN devices may reserve the medium by transmitting a clear-to-send (e.g., CTS2Self) frame with a set duration (e.g., up to 32.767 milliseconds for the 802.11 specification) for a number of reasons, including muting transmissions from connected peer devices for performing off-channel activity, BTCoex (BlueTooth™ coexistence), PHY (physical layer) calibrations, or other reasons. In some embodiments, to mitigate against the channel unavailability during undesirably long NAV reservation and also to achieve the targeted latency budget, transmitters and/or receivers may utilize their secondary radio during undesirably long NAV reservations.

Embodiments herein describe various methodologies for utilizing multiple radio capabilities in a WLAN-capable device to switch to different bands for transmitting and/or receiving WLAN communications under certain trigger conditions. Selectively switching the frequency band for transmitting WLAN communications may be referred to herein as "selective transmission", (S-Tx). According to various embodiments, switching between bands may operate according to one of five modes, among other possibilities, which are briefly summarized here and described in greater detail under separate section headings below.

In a first set of embodiments ("Mode 1"), a UE may operate according to an independent selective mode, which may not rely on any signaling between transmitter (Tx) and receiver (Rx) devices, whereby the Tx device autonomously/automatically switches between bands based on its own criteria and/or conditions In a second set of embodiments ("Mode 2"), a UE may operate according to a basic collaborative selective mode, whereby the Tx device and Rx device exchange critical information to configure how and/or when the band switch may occur. Mode 2 operation may assume that the Rx is awake 100% of the time on all of the available bands.

In a third set of embodiments ("Mode 3"), a UE may operate according to a non-scheduled power-save selective Tx mode. In these embodiments, the Rx device may be asleep on the alternative band most of the time and may be awoken in the alternative band by out-of-band signaling when the channel switch is about to happen at the Tx side.

In a fourth set of embodiments, ("Mode 4"), a UE may operate according to a scheduled power-save selective Tx mode. In these embodiments, the Rx device and Tx device may agree on a particular time window for the Tx device to sleep on each of the resident and alternative bands. The Tx device may switch bands to transmit packets during the time window that corresponds to each particular band.

In a fifth set of embodiments ("Mode 5"), a UE may operate according to selective transmission for a single radio device, whereby the Rx device does not have multiple radio capabilities, and the Tx device and Rx device agree on the switching condition and/or time to keep synchronized on the operating band.

Each of these modes and their corresponding signaling mechanisms are explained in greater detail below.

Figure 4:
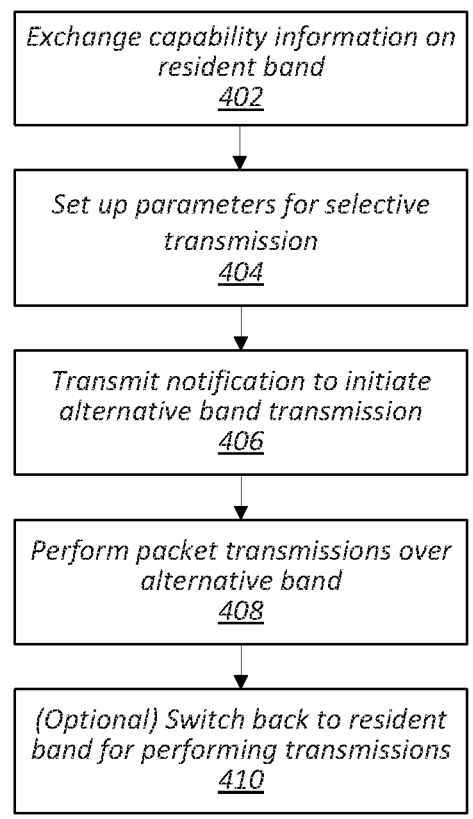
FIG. 4 is a flowchart diagram illustrating a method for implementing selective transmission (S-Tx) over a wireless local area network using multiple links, according to some embodiments.

FIG. 4—Flowchart for Selective Band Transmission

FIG. 4 is a flowchart diagram illustrating a method for conducting a band switch in WLAN communications, according to some embodiments. The method steps described in FIG. 4 may be performed consistently with any of Modes 1-5 described herein, although, as described in greater detail below, the separate modes may differ in their specific implementation of the method steps. In other words, the method steps of FIG. 4 provide a high-level description of a method for conducting a band switch in WLAN communications, while each of Modes 1-5 provide additional specific implementation details, according to various embodiments. The method shown in FIG. 4 may be used in conjunction with any of the computer systems or devices shown in the above Figures, among other devices. The method may be implemented by a processor of the UE, such as the processor(s) 302 illustrated in FIG. 3, which may execute program instructions to cause the UE to implement the described method steps. In various embodiments, some of the elements of the methods shown may be performed concurrently, in a different order than shown, may be substituted for by other method elements, or may be omitted. Additional method elements may also be performed as desired. As shown, the method may operate as follows.

At 402, a capability exchange is performed on the resident band. The capability exchange may be utilized to allow each of the Rx and Tx devices to determine the appropriate mode to use for S-Tx operation. For example, the capability exchange may be utilized for each of the Rx and Tx devices to determine which frequency bands and/or channels the other device is configured to communicate on, whether the other device is capable of simultaneous dual-band communications, band switch latency, or to determine other capability information.

At 404, the signaling parameters of the S-Tx may be set up between the Tx device and the Rx device. In various embodiments, the signaling parameters may include one or more of timing and/or duration of band switching, trigger conditions for switching, or other parameters related to S-Tx operation, as described in greater detail below. In some embodiments, the Tx and Rx devices may exchange signaling to establish signaling parameters for implementing S-Tx. Alternatively, in some embodiments the Tx device may autonomously set up the signaling parameters.

At 406, a notification may be sent that Tx on the alternative band is initiated. In some embodiments, a low power radio such as BlueTooth™ Low Energy (BLE) may (optionally) be used as a wake-up radio to dynamically activate remote band operation.

At 408, packet transmissions may be performed on the alternative band. In other words, the Tx device may transmit packets to the Rx device on the alternative band.

At 410 (optional), the Tx device may switch back to the resident band for performing transmissions. In various embodiments, switching back to the resident band may be performed based on expiration of a timer, or because of a trigger condition, among other possibilities.

The following sections give additional description related to how each of Modes 1-5 may be used to implement steps 402-410 of FIG. 4.

Mode 1: Independent Band Selection

For Mode 1 operation, it may be assumed that the Rx device is awake on both the resident and alternative bands (e.g., the 5 GHz and the 2.4 GHz bands). In some embodiments, both the Tx device and the Rx device are capable of simultaneous dual-band (or potentially tri-band) radio communications.

For step 402, the Tx device and the Rx device may set up a one block acknowledgment (ACK) session on one of the bands, and this block ACK session may be shared between both bands. Note that in typical Wi-Fi operation, each radio may have separate block ACK sessions which may maintain separate sequence numbers and ACK bitmaps for packets sent on different bands.

For step 404, S-Tx may be autonomously/automatically set up on the Tx side. More specifically, the Tx device may set up a latency timer of duration T1 as the channel switching condition. The Tx device may set up a resident band, which may be performed without informing the Rx device since the Rx device may be available on both bands and may use the same block ACK session on both bands. In other words, the Rx device may be configured to receive and acknowledge messages from the Tx device on either of the resident and alternative band, such that the Tx device may set up a first band as the resident band without coordinating with the Rx device.

For step 406, when the Tx device determines that the channel reservation value (e.g., the NAV) on current band is larger than T1, it may switch the transmission to the alternative band and check the NAV value on the alternative band. Subsequently, the Tx device may select the band which has the smaller NAV for transmission. When using three bands, it may use the band having the shortest current NAV among the three possibilities. As another possibility, the Tx device may only switch to a new band if the new band is below a NAV threshold (e.g., T1), but may remain on the resident band otherwise.

For step 408, the Tx device may one or both of a request-to-send (RTS) or clear-to-send (CTS) protocol on the alternate band before the actual packet transmission, to verify that the Rx device is available to receive.

For step 410, if the packet is successfully transmitted on the alternative band, the Tx device may switch back to using the resident band. Alternatively, the Tx device may switch back to the resident band if it has reached the retry limit or reached another time threshold. In some embodiments, the Tx device may only switch back to the resident band if the current NAV of the resident band is less than a threshold. Additionally, or alternatively, the Tx device may track historical information for each band and may use that historical information in determining when to switch between bands. For example, if the Tx device has determined that the resident band is consistently being used for long NAVs, it may prefer the alternative band(s) until the resident band is more available. The same behavior can be used in choosing among alternative band(s) and/or determining when to switch back to the resident band.

Figure 5:
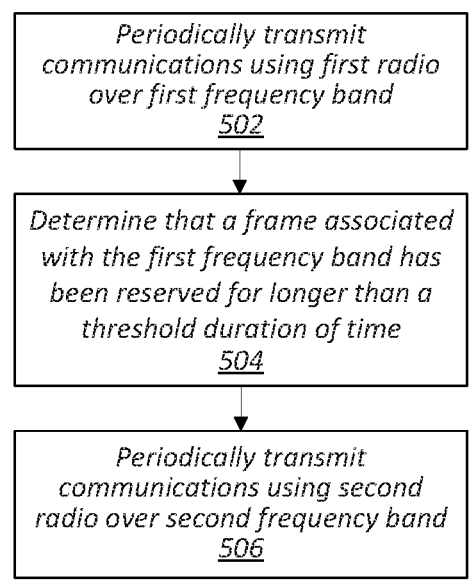
FIG. 5 is a flowchart diagram illustrating a method for switching a frequency band for wireless transmissions based on reservation time, according to some embodiments.

FIG. 5—Flowchart for Mode 1

FIG. 5 is a flowchart diagram illustrating method steps specific to Mode 1 operation for S-Tx implementations, according to some embodiments. The method steps of FIG. 5 may be performed by a UE such as the UEs 106A-B illustrated in FIGS. 1-2, for example. In some embodiments, the method steps may be performed by a processor operably coupled to a first and second radio. In some embodiments, the first radio is configured to perform wireless communications over a first frequency band or channel on a wireless local area network (WLAN), and the second radio is configured to perform wireless communications over a second frequency band or channel on the WLAN. In some embodiments, the first frequency band is a 5 GHz frequency band which serves as a primary or resident band, while the second frequency band is a 2.4 GHz frequency band that serves as a secondary or auxiliary band. Alternatively, each of the first and second frequency bands may be any of a 2.4 GHz, 5 GHz, 6 GHz band, or another frequency band.

In some embodiments, the method steps shown may be performed between a UE and a remote device, which may be another UE of the same or a different type. The communications between the two devices may be associated with an application with a low latency requirement, such as an ultra-reliable low-latency requirement URLLC, for example. A higher frequency band (e.g., the 5 GHz or 6 GHz band) may be generally preferred for low-latency communications, while one or more lower frequency bands may be used as auxiliary bands for backup communication.

While embodiments herein generally refer to selective transmission over first and second frequency bands, other embodiments may apply similar techniques to selective transmission over first and second channels on the same or different frequency bands. In other words, while some embodiments are referent to a "first frequency band" and a "second frequency band" other embodiments may operate similarly, but referent to a "first channel" and a "second channel", where the first and second channels may operate within the same or different frequency bands.

In some embodiments, the remote device may be awake on both the resident and alternative bands (e.g., the 5 GHz and the 2.4 GHz bands). In some embodiments, both the UE and the remote device may be capable of simultaneous dual-band (or potentially tri-band) radio communications. In other words, both the UE and the remote device may be simultaneously available on both of the first and second frequency bands. In some embodiments, may device may be configured to perform channel hopping onto the same channels in their respective bands. For example, the traffic pattern of a low latency application associated with communications between the UE and the remote device may be known to both the transmitter and receiver, such that the periodicity at which the packets are to be transmitted and received may be known. In some embodiments, both the UE and the remote device may be synchronized by a peer-to-peer protocol such as Wi-Fi Aware™ or another protocol.

In various embodiments, some of the elements of the methods shown may be performed concurrently, in a different order than shown, may be substituted for by other method elements, or may be omitted. Additional method elements may also be performed as desired. As shown, the method may operate as follows.

At 502, communications are periodically transmitted to a remote device over a first frequency band on the WLAN using a first radio.

At 504, a frame associated with the first frequency band is determined to have been reserved for longer than a threshold duration of time. In some embodiments, determining that the frame associated with the first frequency band has been reserved for longer than the threshold duration of time includes monitoring a header field of a broadcast message from a second remote device (e.g., one not involved in the communication of FIG. 5), wherein the header field includes a network allocation vector (NAV) reservation.

In some embodiments, the equation shown below may be used to determine whether to switch transmissions to the second frequency band, where x is acceptable packet delay for the low latency communication (e.g., x may be the number of milliseconds for which a low latency communication between the UE and the remote device may be delayed without adversely affecting the communication, such as by causing a delayed received packet to be dropped), n is the remaining time that the frame is reserved, p is a packet duration based on Tx packet size, Tx rate and/or BlockAck time, and g is a guard time.

$$t = x - (n + p + g), \quad (1)$$

In Equation 1, the UE may determine to switch to transmit communications using the second radio over the second frequency band if t is negative, and may continue transmitting communications using the first radio over the first frequency band if t is positive, in some embodiments.

If 2.4 GHz NAV expiry is less than t then move the packets from 5 GHz radio to 2.4 GHz radio and schedule the packet for transmission on 2.4 GHz.

At 506, based at least in part on determining that the frame associated with the first frequency band has been reserved for longer than the threshold duration of time, communications are periodically transmitted to the remote device on the WLAN using the second radio until a remaining duration of time that the frame is reserved is less than the threshold duration of time.

In some embodiments, the methods steps of FIG. 5 may be performed only when the transmitter and receiver experience a mutual signal strength that is greater than a threshold level such as −70 dB or another signal strength threshold. For example, it may be determined whether a signal strength of transmissions received from the remote device is above a signal strength threshold. In these embodiments, said periodically transmitting communications to the remote device on the WLAN using the second radio may be performed further based at least in part determining that the signal strength of transmissions received from the remote device is above the signal strength threshold.

In some embodiments, subsequent to determining that the frame associated with the first frequency band has been reserved for longer than the threshold duration of time, it may be determined that the second frequency band has been reserved for transmitting BlueTooth™ communications. For example, in some embodiments the 2.4 GHz band may be utilized for both BlueTooth™ communications and WLAN communications, and a low latency WLAN communication may generally have a higher priority than a BlueTooth™ communication. In these embodiments, current transmissions of BlueTooth™ communications over the second frequency band may be aborted and/or future transmissions of BlueTooth™ communications over the second frequency band may be suspended while the UE is periodically transmitting communications to the remote device on the WLAN using the second radio.

In some embodiments, it may be determined that a number of suspended transmissions of BlueTooth™ communications exceeds a predetermined threshold. In these embodiments, based at least in part on determining that the number of suspended transmissions of BlueTooth™ communications exceeds the predetermined threshold, transmission of BlueTooth™ communications over the second frequency band may be resumed, and/or periodically transmitting communications to the remote device on the WLAN using the first radio may be resumed.

In some embodiments, subsequent to determining at step 504 that the frame associated with the first frequency band has been reserved for longer than the threshold duration of time, the transmitting UE may determine whether a frame of the second frequency band is also currently reserved. If the frame of the second frequency band is also currently reserved, the transmitting UE may determine which frequency band has a shorter duration of remaining reservation, and may use the frequency band with a shorter remaining reservation for performing transmissions to the remote device. If the second frequency band is not currently reserved, the UE may determine to use the second frequency band.

In some embodiments, based on a determination that the remaining duration of time that the frame is reserved is less than the threshold duration of time, periodically transmitting communications to the remote device on the WLAN may be resumed using the first radio.

In some embodiments, the remote device may perform a similar determination as the transmitter. For example, the remote device may determine that the frame of the first frequency band has been reserved for longer than the threshold duration of time, and the remote device may anticipate the switch to the second frequency band. Alternatively or additionally, the remote device may be aware of the scheduled periodicity of transmissions from the transmitting UE, and may detect an absence of reception over the first frequency band within a time window, and may determine that the UE intends to switch to transmissions over the second frequency band.

Regardless of how the remote device determines that the transmitting UE intends to switch to the second frequency band for transmission, once determined, the remote device may abort any ongoing BlueTooth™ or other activity on the second frequency band in anticipation of the packet transmission from the UE device. In some embodiments, the remote device may suspend any ongoing BlueTooth™ communications and delay any upcoming BlueTooth™ communications until either the packet reception with the UE device over the second frequency band is finished or a timeout occurs for waiting for the packet from the transmitting UE device over the second frequency band.

In some embodiments, the number of overrides over BlueTooth™ (or communications over the second frequency band on other RATs) may be limited to a given time period, beyond which the WLAN prioritization request may be rejected and BlueTooth™ communications may be resumed over the second frequency band. In some embodiments, the remote device may be preconfigured with a maximum duration of time to receive packets over the second frequency band before switching back to the first frequency band.

In some embodiments, the second frequency band may be unavailable because of another NAV reservation on that band, because of a WLAN prioritization request rejection, or because the UE does not support simultaneous band operation. In these embodiments, the transmitting UE may move the outgoing packets to a secondary pre-negotiated channel on the first frequency band in an ad-hoc manner for transmission. For example, in some embodiments the UE device supports simultaneous transmission and/or reception on multiple bands, and the UE may operate on two channels at the same time, e.g., a primary channel 149 on the 5 GHz band and a secondary channel 1 on the 2.4 GHz. These two channels may be pre-negotiated and the receiver may continually sense for received packets on both channels at the same time. Accordingly, the transmitting UE may transition between bands and/or channels in an ad-hoc manner.

While the method steps described in reference to FIG. 5 refer to a "transmitting UE" that is performing transmissions to a "remote device" that is receiving the transmissions, it is within the scope of the present disclosure that communications between two WLAN-capable devices may be bi-directional, such that a pair of devices switch between being a transmitter and receiver. In these embodiments, the described methods may alternatively be performed by either of the two communicating devices, as desired.

Mode 2: Collaborative Band Selection

Mode 2 operation may include a collaborative approach to S-Tx transmissions, according to some embodiments. For Mode 2 operation, the Rx device may be assumed to be awake on both the resident and alternative bands (e.g., the 5 GHz and the 2.4 GHz bands).

For step 402, the Tx device and the Rx device may exchange packets to set up the band selection operation. In some embodiments, the Tx device and the Rx device may exchange a traffic flow identifier (TID) which may allow the RX device to prepare the data path processing ahead of time. The block ACK session for the specified TID may be shared between the resident and alternative bands. The Tx device and the Rx device may further exchange a packet switch condition that defines a latency threshold. For example, the packet switch condition may define a latency threshold beyond which the Tx may switch to another band. The Tx device and the Rx device may further exchange an order of the band(s) to use. For example, the Tx device and the Rx device may negotiate 5 Ghz as the resident band to use primarily, the 6 Ghz band as a first alternative band, and the 2.4 Ghz band as a second alternative band to use (e.g., if both the 5 GHz and 6 Ghz bands are congested or otherwise unavailable). The Tx device and the Rx device may further exchange a band switch delay that specifies the time at which the Tx device and the Rx device switch to another band. The Tx device and the Rx device may further exchange band switching tentativeness that specifies whether the alternative band is used tentatively or whether the two devices may stay on the currently utilized band until the next switch trigger. In other words, the band switching tentativeness exchanged between the two devices may specify whether the alternative band is to be used for some predetermined amount of time, or whether the alternative band is to be used indefinitely until the occurrence of a switch trigger that triggers resumption of communications over the resident band.

For step 404, when the packet switch condition is triggered, the Tx device may switch to the next band agreed in step 402.

For step 406, after the Tx device switches to the next band, it may exchange an RTS/CTS to confirm that both the Tx device and the Rx device are on the same band.

For step 408, the packet transmission may be performed on the alternative band.

For step 410, after the packet transmission, the Tx device may switch back to the resident band, or alternatively it may stay on the current band based on band switching tentativeness, as described above.

Mode 3: Non-Scheduled Power-Save Selective Tx Mode

Mode 3 operation may implement non-scheduled S-Tx operation, according to some embodiments. For mode 3 operation, the radio operating on an alternative band may not be awake 100% of time. For example, the Tx device and/or the Rx device may be configured to switch between transmission and/or reception over each of two or more bands, but may not have the capability of transmitting/receiving over multiple bands simultaneously. In these embodiments, at step 406, the Tx device may send an out-of-band mechanism to wake up the radio of the Rx device on the alternative band. In some embodiments, the out-of-band mechanism may be a BlueTooth™ Low Energy (BLE) packet or another type of wake-up radio mechanism.

Mode 4: Scheduled Power-Save Selective Tx Mode

For Mode 4 operation, the radios of the Tx device and/or the Rx device may operate according to a duty-cycle based on a setup procedure implemented between the Tx device and the Rx device. The duty cycle may be utilized to save power, as the transmitter/receiver may enter a low power mode in between active portions of the duty cycle.

Figure 6:
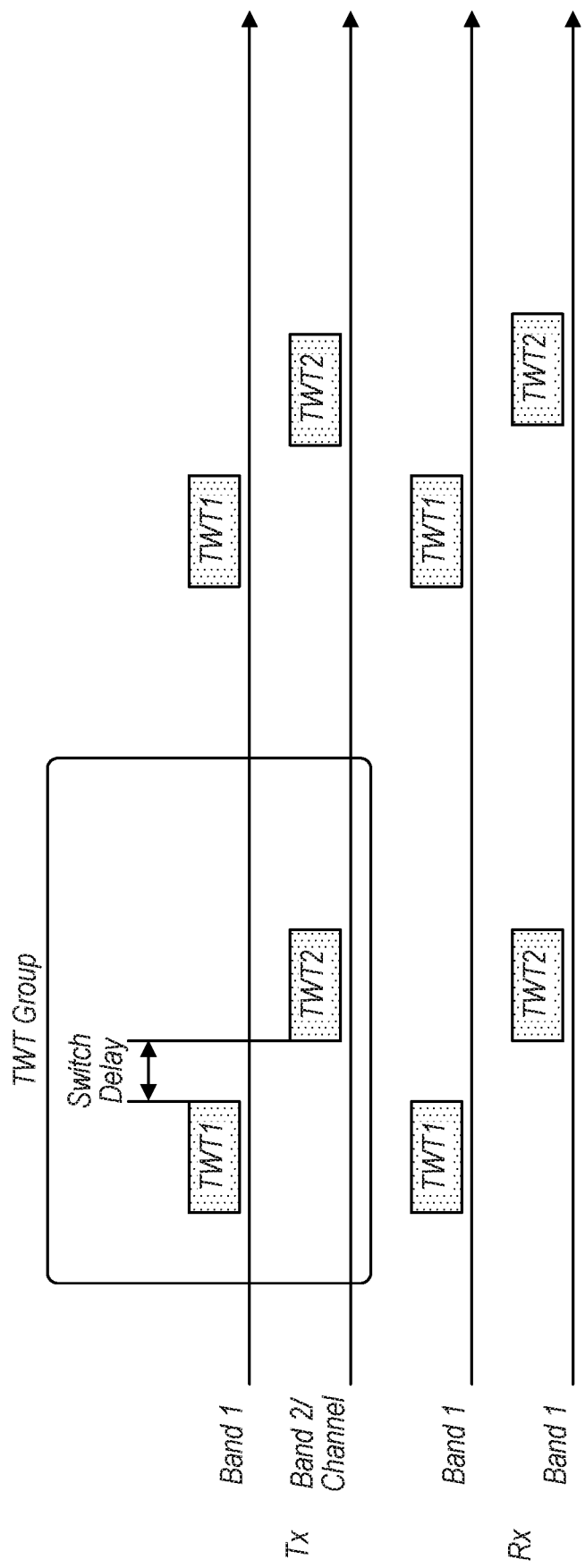
FIG. 6 illustrates scheduling of target wakeup times (TWTs) for a transmitter device and a receiver device implementing a S-Tx mode, according to some embodiments.

For steps 402-404, as illustrated in FIG. 6, the Tx device and the Rx device may negotiate the wake/sleep cycle through target wakeup time (TWT) messages for the radios on the bands to be used. For example, the Tx device and the Rx device may exchange signaling to setup a TWT schedule, whereby transmissions from the Tx device to the Rx device exclusively occur during active periods of the TWT schedule. In some embodiments, the TWTs may be grouped into TWT groups, whereby a single group TWT is set up for multiple radios. In some embodiments, the time difference between TWT service periods within a TWT group may be configured to be larger than the band switch delay. For example, a subsequent TWT of the TWT schedule may be set to occur a period of time after completion of a previous TWT that is greater than the delay incurred in switching from the first frequency band to the second frequency band, as illustrated in FIG. 6. In some embodiments, the active durations of the configured duty cycle may be set so as to not overlap with the band switch procedure. In some embodiments, both the Tx and Rx devices may switch between bands according to the TWT schedule and may not sleep outside of the TWT service periods.

For step 406, if a packet is unable to be transmitted in the resident band in TWT 1, the TX device may switch to the next TWT service period on a different band and transmit there, if it succeeds in the medium contention with other devices. After packet transmission, the TX device may switch back to the resident band in the next TWT group time window. In these embodiments, the TWT service periods within a TWT may serve as a backup transmission time, in case the packet is unable to be transmitted in a previous TWT service period in the same TWT group. Advantageously, the TWT setup may allow the multiple radios to be awake only at particular times, thus saving power without the need for implementing an out-of-band mechanism.

Mode 5: Single-Radio Selective Tx Mode

For Mode 5 operation, the Tx and/or Rx device may have a single radio whereby they are not be capable of concurrently operating on multiple links, but are configured to alternate between operation on different bands. In these embodiments, the Tx and Rx devices may be synchronized in time through beacons or another synchronization protocol such as 802.1AS.

Figure 7:
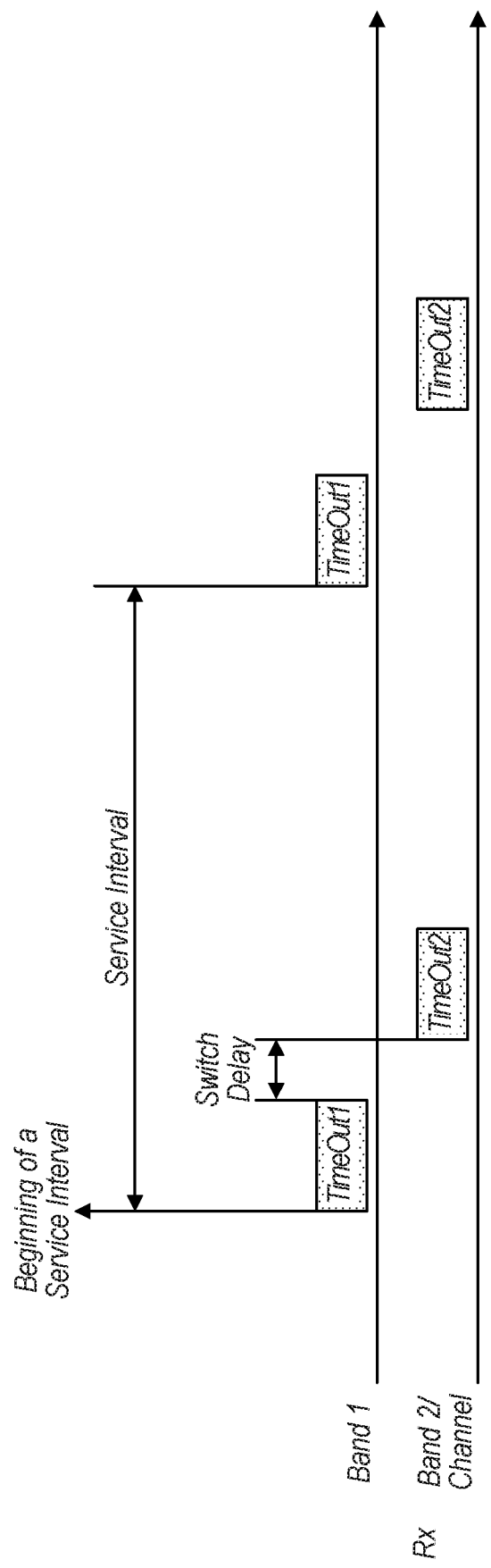
FIG. 7 illustrates an implementation of single-radio S-Tx mode by a receiver device, according to some embodiments.

For step 404, the Tx and Rx devices may exchange additional parameters, including one or more of: a beginning of the service interval; an interval between service intervals; a first time-out value whereby, if the Rx device does not receive any transmissions from the Tx device for the first time-out value on the resident band, it switches from the resident channel to the alternative channel; and/or a second time-out value whereby, if the Rx device does not receive any transmissions from the Tx device over the alternative band after switching to the alternative band, it switches back to the resident band. An example implementation of the first and second time-out values and the establishment of a service interval is illustrated in FIG. 7, according to some embodiments. For example, FIG. 7 illustrates how, subsequent to beginning a service interval, the Rx device waits to receive a transmission over band 1 for a duration of time equal to a first timeout value (TimeOut1). If the Rx device does not receive a transmission from the Tx device over band 1 before the first timeout value expires, it will switch to monitoring for transmissions on band 2, and initiate a second timeout value timer (TimeOut2) after waiting for a duration equal to the switch delay. Finally, if no transmission is received over band 2 after expiration of the second timeout value, at the expiration of the service interval, the Rx device may resume monitoring for messages over band 1 and reset the first timeout value timer.

Furthermore, in some embodiments the TWT may be modified to indicate that the TWT 1 service period duration is re-defined as the first time-out value, and the TWT 2 service period duration is re-defined as the second time-out value. Alternatively, in some embodiments a new information element may be defined to carry the four parameters: beginning of service interval, interval of service interval, the first time-out value, and the second time-out value.

Implementation Details for the 802.11 Standard Protocol

The following paragraphs describe specific implementation details for implementing embodiments described herein within the 802.11 (e.g., 802.11be) Standard Protocol. The following paragraphs are intended to illustrate a specific example of some embodiments, and is not intended to be limiting to the scope of the disclosure as a whole, which may be applicable to a variety of WLAN standards and technologies.

Figure 8:
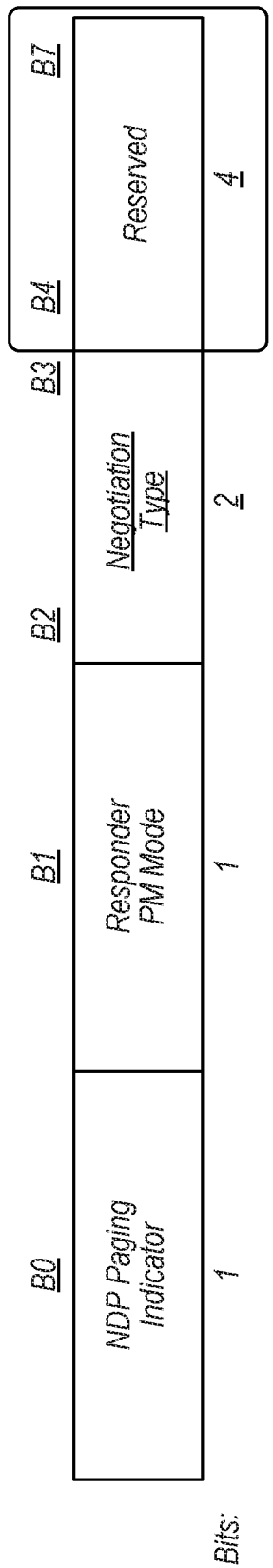
FIG. 8 is an example of bit field allocation for the 802.11be standard, according to some embodiments.

To accommodate operation of Modes 1-5 described above within the 802.11be Standard Protocol, one or more of the following signaling elements may be defined. The additional signaling elements may be included in the reserved bit field of the protocol messages, as illustrated in FIG. 8, in some embodiments.

1. Selective Multi-link capability information element (IE), which includes a field for the Selective-Tx (S-Tx) mode supported by the transmitting device, and a field specifying the band switch delay for the device.

2. Selective multi-link setup information element, which includes one or more of a fields to specify out-of-band wake up latency, whether the resident band is currently in use, whether one or more alternative band(s) are in use and the order of the band(s) for switching, traffic flow identifier(s) (TID(s)) that specify whether the device is allowed to use the selective multi-link switch scheme, and/or the tentativeness of the band switch (i.e., whether the switch will persist-permanent after the current packet transmission).

In some embodiments, the TWT information element may be modified depending on the mode employed, according to various embodiments. For example, for Mode 4 operation, the TWT IE may include an indication that the TWT is for a group TWT using one of the reserved bits in TWT IE Control field. If this bit is set, then the TWT parameters may be redefined to indicate that the TWT parameters in the TWT IE indicate the TWT on the resident band. For Mode 4 operation, the TWT IE may further specify that the TWT on the alternate band(s) are separated in time by a band switch delay.

For Mode 5 operation, the TWT IE may include an indication that the TWT is for Mode 5 operation using reserved bits in TWT IE Control field. If this bit is set, the TWT parameters may be redefined to indicate that the TWT service period duration indicates a timeout value to switch to the next band. Alternatively, for Mode 5 operation, a new IE may be defined as an action frame to carry the following four parameters: beginning of service interval, interval of service interval, first time-out value, and second time-out value.

Figure 9:
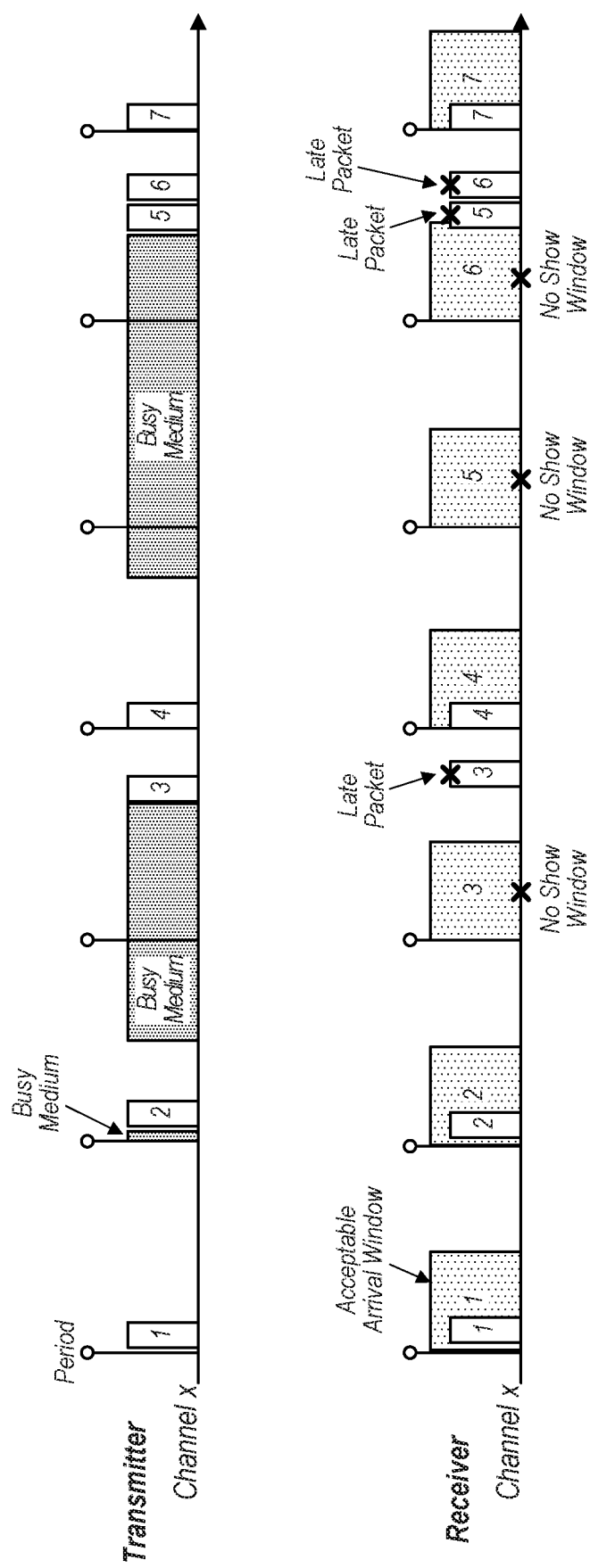
FIG. 9 is a schematic diagram illustrating a situation where late packets arrive during a low-latency traffic transmission, according to some embodiments.

FIG. 9—Late Packets in Low Latency Traffic Transmissions

FIG. 9 is a schematic diagram illustrating a situation where late packets arrive during a low-latency traffic transmission. In some embodiments, large NAV reservations and/or a busy transmission medium may delay the transmission of packets. Transmission delays beyond a given time window may cause packets to arrive late, and late packets may be dropped by an application with strict latency requirements.

Figure 10:
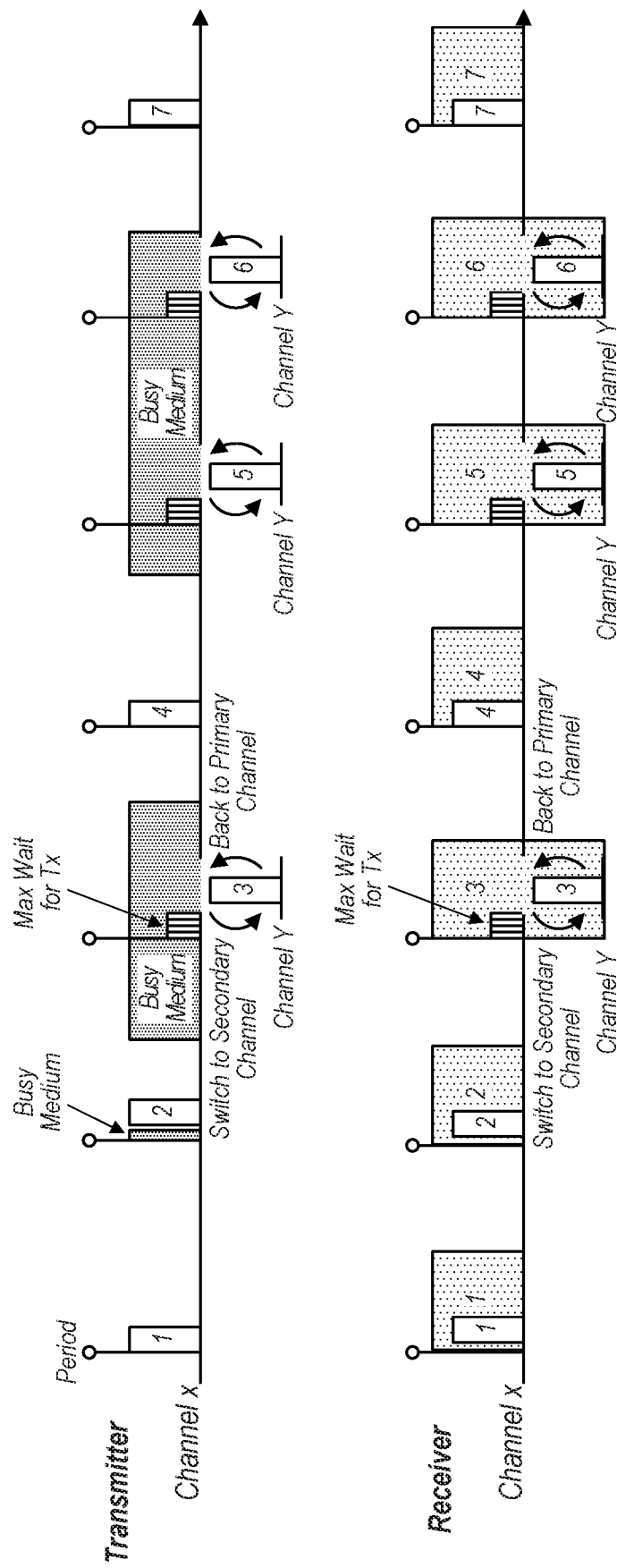
FIG. 10 is a schematic diagram illustrating a method for mitigating late packet transmissions during a low-latency traffic transmission, according to some embodiments.

FIG. 10—Late Packet Mitigation

FIG. 10 is a schematic diagram illustrating a method for mitigating late packet transmissions during a low-latency traffic transmission, according to some embodiments. In the illustrated diagram, both the transmitter and receiver are simultaneously available on both 2.4 GHz and 5 GHz frequency bands. Transmission may preferably be performed on the 5 GHz band (e.g., because of its larger throughput) which may be considered primary band/channel. Packets waiting to get medium access for transmission for more than a maximum wait time 'x' may switch to transmission over a secondary band/channel (e.g., the 2.4 GHz band).

FIG. 11—Flowchart for Late Packet Mitigation

FIG. 11 is a flowchart diagram illustrating a method for mitigating late packet transmissions, according to some embodiments. The method steps of FIG. 11 may be performed by a UE such as the UEs 106A-B illustrated in FIGS. 1-2, for example. In some embodiments, the method steps may be performed by a processor operably coupled to a first and second radio. In some embodiments, the first radio is configured to perform wireless communications over a first frequency band or channel on a wireless local area network (WLAN), and the second radio is configured to perform wireless communications over a second frequency band or channel on the WLAN. In some embodiments, the first frequency band is a 5 GHz frequency band which serves as a primary or resident band, while the second frequency band is a 2.4 GHz frequency band that serves as a secondary or auxiliary band. Alternatively, each of the first and second frequency bands may be any of a 2.4 GHz, 5 GHz, 6 GHz band, or another frequency band.

In some embodiments, the method steps shown may be performed between a UE and a remote device, which may be another UE of the same or a different type. The communications between the two devices may be associated with an application with a low latency requirement, such as an ultra-reliable low-latency requirement URLLC, for example. A higher frequency band (e.g., the 5 GHz or 6 GHz band) may be generally preferred for low-latency communications, while one or more lower frequency bands may be used as auxiliary bands for backup communication.

In some embodiments, the remote device may be awake on both the resident and alternative bands (e.g., the 5 GHz and the 2.4 GHz bands). In some embodiments, both the UE and the remote device may be capable of simultaneous dual-band (or potentially tri-band) radio communications. In other words, both the UE and the remote device may be simultaneously available on both of the first and second frequency bands. In some embodiments, may device may be configured to perform channel hopping onto the same channels in their respective bands. For example, the traffic pattern of a low latency application associated with communications between the UE and the remote device may be known to both the transmitter and receiver, such that the periodicity at which the packets are to be transmitted and received may be known. In some embodiments, both the UE and the remote device may be synchronized by a peer-to-peer protocol such as Wi-Fi Aware™ or another protocol.

In various embodiments, some of the elements of the methods shown may be performed concurrently, in a different order than shown, may be substituted for by other method elements, or may be omitted. Additional method elements may also be performed as desired. As shown, the method may operate as follows.

At 1102, a packet may be queued by a UE for transmission to a remote device.

At 1104, the UE may check the 5 GHz NAV reservation to see when resources will be available for transmitting the packet.

At 1106, the UE determines whether the 5 GHz NAV reservation is longer than a latency budget of the packet. If the NAV reservation will be available in a shorter duration than the latency budget, at 1108 the UE may wait for available transmission resources and transmit the packet on the 5 GHz band.

On the other hand, if the 5 GHz NAV reservation is longer than the latency budget, at 1110 the UE may perform a packet crossover to transmit the packet over the 2.4 GHz band.

At 1112, the UE may check the 2.4 GHz NAV reservation to determine if and/or when resources will be available for transmitting the packet over the 2.4 GHz band.

At 1114, the UE determines whether the 2.4 GHz NAV reservation is longer than the latency budget of the packet. If the 2.4 GHz NAV reservation is longer than the latency budget of the packet, at 1116 the UE drops the packet.

On the other hand, if the 2.4 GHz NAV reservation is not longer than the latency budget of the packet, at step 1118 the UE may check whether the 2.4 GHz radio of the UE is currently in use for BlueTooth™ communications or for another type of communication. At 1120, the UE may determine whether WiFi transmissions are currently allowed. If not (e.g., because the 2.4 GHz radio is currently in use for BlueTooth™), the UE drops the packet at step 1116. On the other hand, if WiFi transmissions are currently allowed over 2.4 GHz, at step 1122 the UE transmits the packet over the 2.4 GHz frequency band.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device, comprising:
   one or more radios operably coupled to respective antennas; and
   a processor operably coupled to the one or more radios;
   wherein the processor is configured to cause the UE device to:
   exchange capability information with a second device over a primary frequency band of a wireless local area network (WLAN), wherein the capability information specifies information related to selective transmission over an alternative frequency band;
   set up signaling parameters for the selective transmission over the WLAN using the alternative frequency band based at least in part on the capability information exchange;
   transmit a notification to the second device to initiate selective transmission over the alternative frequency band; and
   transmit one or more messages to the second device over the alternative frequency band.

2. The UE device of claim 1, wherein the UE device is further configured to:
   after transmitting the one or more messages over the alternative frequency band, resume transmission of messages to the second device over the primary frequency band.

3. The UE device of claim 1,
   wherein said exchanging signaling to setup selective transmission over the WLAN comprises establishing a target wakeup time (TWT) schedule;
   wherein said transmitting the one or more messages to the second device over the alternative frequency band is performed according to the TWT schedule.

4. The UE device of claim 3,
   wherein a time difference between TWT service periods of the TWT schedule is set to be greater than a band switch delay.

5. The UE device of claim 1,
   wherein said setting up parameters for selective transmission over the WLAN comprises exchanging parameters with the second device to specify one or more of:
   a beginning of a service interval for transmitting the one or more messages to the second device over the alternative frequency band; or
   an interval between the service interval and subsequent service intervals.

6. The UE device of claim 1,
   wherein said setting up parameters for selective transmission over the WLAN comprises exchanging parameters with the second device to specify one or both of a first time-out value and a second time-out value, wherein the first time-out value specifies a first amount of time for the second device to wait to receive messages over the primary frequency band before switching to monitor for messages over the alternative frequency band, wherein the second time-out value specifies a second amount of time for the second device to wait to receive messages over the alternative frequency band before switching back to monitoring for messages over the primary frequency band.

7. The UE device of claim 1,
   wherein said transmitting the notification to the second device to initiate selective transmission over the alternative frequency band comprises transmitting a wakeup notification to the second device on a frequency band outside of the primary frequency band.

8. The UE device of claim 1,
   wherein the capability information specifies one or more of:
   the alternative frequency band;
   one or more channels associated with the alternative frequency band;
   whether one or both of the UE device and the second device support simultaneous dual-band communications; and
   band switch latency.

9. The UE device of claim 1,
wherein exchanging capability information comprises setting up a block acknowledgment (ACK) session shared between the primary and alternative frequency bands.

10. The UE device of claim 1, wherein the capability information comprises one or both of:
a traffic flow identifier (TID); and
a latency threshold for switching between the primary and alternative frequency bands.

11. An apparatus, comprising:
a processor configured to cause a user equipment (UE) device to:
exchange capability information with a second device over a primary frequency band of a wireless local area network (WLAN), wherein the capability information specifies information related to selective transmission over an alternative frequency band;
set up signaling parameters for the selective transmission over the WLAN using the alternative frequency band based at least in part on the capability information exchange;
transmit a notification to the second device to initiate selective transmission over the alternative frequency band; and
transmit one or more messages to the second device over the alternative frequency band.

12. The apparatus of claim 11, wherein the processor is further configured to cause the UE device to:
after transmitting the one or more messages over the alternative frequency band, resume transmission of messages to the second device over the primary frequency band.

13. The apparatus of claim 11,
wherein said exchanging signaling to setup selective transmission over the WLAN comprises establishing a target wakeup time (TWT) schedule;
wherein said transmitting the one or more messages to the second device over the alternative frequency band is performed according to the TWT schedule, and
wherein a time difference between TWT service periods of the TWT schedule is set to be greater than a band switch delay.

14. The apparatus of claim 11,
wherein said setting up parameters for selective transmission over the WLAN comprises exchanging parameters with the second device to specify one or more of:
a beginning of a service interval for transmitting the one or more messages to the second device over the alternative frequency band; or
an interval between the service interval and subsequent service intervals.

15. The apparatus of claim 11,
wherein said setting up parameters for selective transmission over the WLAN comprises exchanging parameters with the second device to specify a first time-out value and a second time-out value,
wherein the first time-out value specifies an amount of time for the second device to wait to receive messages over the primary frequency band before switching to monitor for messages over the alternative frequency band, and
wherein the second time-out value specifies an amount of time for the second device to wait to receive messages over the alternative frequency band before switching back to monitoring for messages over the primary frequency band.

16. A method for operating a user equipment (UE) device, the method comprising:
exchanging capability information with a second device over a primary frequency band of a wireless local area network (WLAN), wherein the capability information specifies information related to selective transmission over an alternative frequency band;
setting up signaling parameters for the selective transmission over the WLAN using the alternative frequency band based at least in part on the capability information exchange;
receiving a notification from the second device to initiate selective transmission over the alternative frequency band; and
receiving one or more messages from the second device over the alternative frequency band.

17. The method of claim 16, further comprising:
after receiving the one or more messages over the alternative frequency band, resuming reception of messages from the second device over the primary frequency band.

18. The method of claim 16,
wherein said exchanging signaling to setup selective transmission over the WLAN comprises establishing a target wakeup time (TWT) schedule;
wherein said receiving the one or more messages from the second device over the alternative frequency band is performed according to the TWT schedule, and
wherein a time difference between TWT service periods of the TWT schedule is set to be greater than a band switch delay.

19. The method of claim 16,
wherein said setting up parameters for selective transmission over the WLAN comprises exchanging parameters with the second device to specify one or more of:
a beginning of a service interval for receiving the one or more messages from the second device over the alternative frequency band; or
an interval between the service interval and subsequent service intervals.

20. The method of claim 16,
wherein said setting up parameters for selective transmission over the WLAN comprises exchanging parameters with the second device to specify one or both of a first time-out value and a second time-out value, wherein the first time-out value specifies a first amount of time for the UE device to wait to receive messages over the primary frequency band before switching to monitor for messages over the alternative frequency band, wherein the second time-out value specifies a second amount of time for the UE device to wait to receive messages over the alternative frequency band before switching back to monitoring for messages over the primary frequency band.

* * * * *